(12) United States Patent
Konik et al.

(10) Patent No.: US 11,176,506 B2
(45) Date of Patent: Nov. 16, 2021

(54) BLOCKCHAIN EXPENSE AND RESOURCE UTILIZATION OPTIMIZATION

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Ostego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 15/294,461

(22) Filed: Oct. 14, 2016

(65) Prior Publication Data

US 2018/0107958 A1 Apr. 19, 2018

(51) Int. Cl.
*G06Q 10/06* (2012.01)
*G06Q 20/38* (2012.01)
*G06Q 20/06* (2012.01)

(52) U.S. Cl.
CPC ... *G06Q 10/0637* (2013.01); *G06Q 10/06315* (2013.01); *G06Q 20/0658* (2013.01); *G06Q 20/382* (2013.01); *G06Q 2220/00* (2013.01)

(58) Field of Classification Search
CPC .............. G06Q 20/065; G06Q 20/34; G06Q 10/06315; G06Q 20/0658; G06Q 20/382; G06Q 10/0637
USPC ......................................................... 705/64
See application file for complete search history.

(56) References Cited

U.S. PATENT DOCUMENTS

| 10,068,228 | B1 * | 9/2018 | Winklevoss et al. |
| 2015/0294425 | A1 | 10/2015 | Benson |
| 2016/0321115 | A1 * | 11/2016 | Thorpe et al. |
| 2017/0300875 | A1 * | 10/2017 | GilBoa et al. |
| 2017/0308872 | A1 * | 10/2017 | Uhr et al. |
| 2018/0006807 | A1 * | 1/2018 | Suresh et al. |
| 2018/0225611 | A1 * | 8/2018 | Daniel et al. |

FOREIGN PATENT DOCUMENTS

| WO | WO2016037282 A1 | 3/2016 |
| WO | WO2016046821 A1 | 3/2016 |

OTHER PUBLICATIONS

Bitcoin Mining Decentralization via Cost Analysis (Year: 2016).*
Taylor, Michael Bedford, "Bitcoin and the Age of Bespoke Silicon," Int'l. Conf. on Compilers, Architecture and Synthesis for Embedded Systems (CASES), IEEE Press, 2013.
Ala-Peijari, Ossi, "Bitcoin the Virtual Currency: Energy Efficient Mining of Bitcoins," Thesis, Aalto University, Aug. 24, 2014.
Harvey-Buschel et al., "Bitcoin Mining Decentralization via Cost Analysis," arXiv preprint arXiv:1603.05240 (2016).

* cited by examiner

*Primary Examiner* — James D Nigh
*Assistant Examiner* — Yin Y Choi

(57) ABSTRACT

A blockchain configuration may require constant and large amounts of resources to maintain a growing structure. One example method of operation may include receiving blockchain transactions and creating a blockchain block, identifying miner devices to process the blockchain block, identifying expenses associated with each of the miner devices, selecting an optimal cost miner device among the miner devices based on the identified expenses associated with each of the miner devices, and assigning the optimal cost miner device to solve the blockchain block.

17 Claims, 6 Drawing Sheets

300

BLOCKCHAIN EXPENSE AND RESOURCE UTILIZATION OPTIMIZATION

TECHNICAL FIELD

This application relates to identifying blockchain transaction opportunities and more specifically to optimizing the various types of operations associated with operating a blockchain.

BACKGROUND

In a blockchain configuration, as blocks are populated with transactions, the operations related to those transactions may require memory, central processing unit (CPU) utilization, virtual machine resources, etc. Miners and other interested parties may seek to offer resources in blockchain configurations associated with various crypto-currencies. In those instances, third parties can provide processing resources to encrypt a blockchain block with a hashing algorithm. Since the very nature of crypto-currencies is financial, there are inherent taxes, expenses and other line items requiring time and resources in addition to energy, CPU power, memory and other computer network related expenses. As such, it would be beneficial to examine resources available on a large scale to provide opportunities to save time, money and other resources which may not be utilized properly.

SUMMARY

One example embodiment may include a method that comprises one or more of receiving blockchain transactions, creating a blockchain block, identifying a plurality of miner devices to process the blockchain block, identifying expenses associated with each of the plurality of miner devices, selecting an optimal cost miner device among the plurality of miner devices based on the identified expenses associated with each of the plurality of miner devices, and assigning the optimal cost miner device to solve the blockchain block.

Another example embodiment may include an apparatus that that comprises one or more of a receiver configured to receive blockchain transactions of a blockchain block, and a processor configured to identify a plurality of miner devices to process the blockchain block, identify expenses associated with each of the plurality of miner devices, select an optimal cost miner device among the plurality of miner devices based on the identified expenses associated with each of the plurality of miner devices, and assign the optimal cost miner device to solve the blockchain block.

Still another example embodiment may include a non-transitory computer readable storage medium configured to store instructions that when executed cause a processor to perform one or more of receiving blockchain transactions, creating a blockchain block, identifying a plurality of miner devices to process the blockchain block, identifying expenses associated with each of the plurality of miner devices, selecting an optimal cost miner device among the plurality of miner devices based on the identified expenses associated with each of the plurality of miner devices, and assigning the optimal cost miner device to solve the blockchain block.

DETAILED DESCRIPTION

Figure 1A:
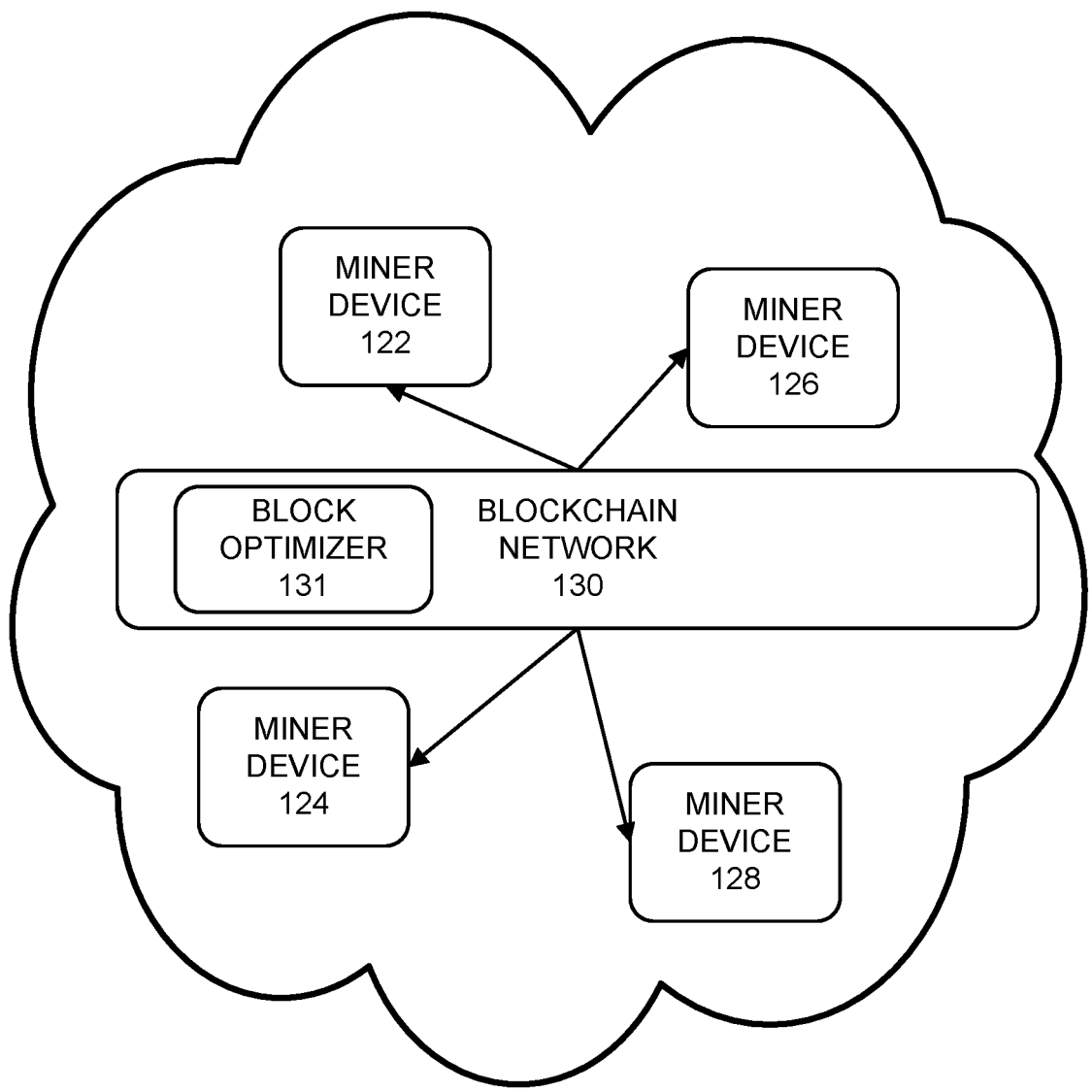
FIG. 1A illustrates a network diagram of a distributed blockchain resource network configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which identifies a blockchain block configuration and determines an optimal processing platform for that block. As blockchain transactions accumulate in a single block, a processing module or device may offer the processing necessary to complete the block as a final product with an encryption hash and an irrevocable result which can be accessed by auditors and other interested parties at a later time. The reason to solicit the block completion phase comes from an inherent reward for handling the processing. For example, certain crypto-currencies offer a number of credits or coins for completing a block. Those entities which offer such services are referred to as miners and are in a race to complete a block based on time vs. processing costs and/or considerations. Resources are available on a global scale and may include remote processing machines, virtual machines, etc. Also, energy, such as electricity, natural gas and other resources including but not limited to local government tax rates, CPU usage, memory usage, machine rental costs, staff labor costs, machine depreciation, tax deductions, etc., can also be part of the overall expense which can be determined upfront prior to engaging a computer processing platform to complete blockchain blocks.

FIG. 1A illustrates a network diagram of a distributed blockchain resource network configuration according to example embodiments. The network 100 in FIG. 1A includes a network cloud which may include any portion of the Internet, a private network, a local network, etc. The blockchain network 130 includes any devices (not shown) used to transmit, receive and/or process blockchain transactions and store accumulating transactions in blockchain blocks. In operation, as a block is populated to its completion size, the block optimizer 131 may arrange to select a miner device(s) to handle the block finalization (i.e., solution). The optimizer 131 may perform calculations for each of the various miner devices 122, 124, 126 and/or 128, which may be co-located in a common network environment or may be located at different locations across the world. The optimizer 131 may move computations from a previous device to a new device and may stripe computations across multiple devices in the blockchain processing procedures.

Figure 1B:
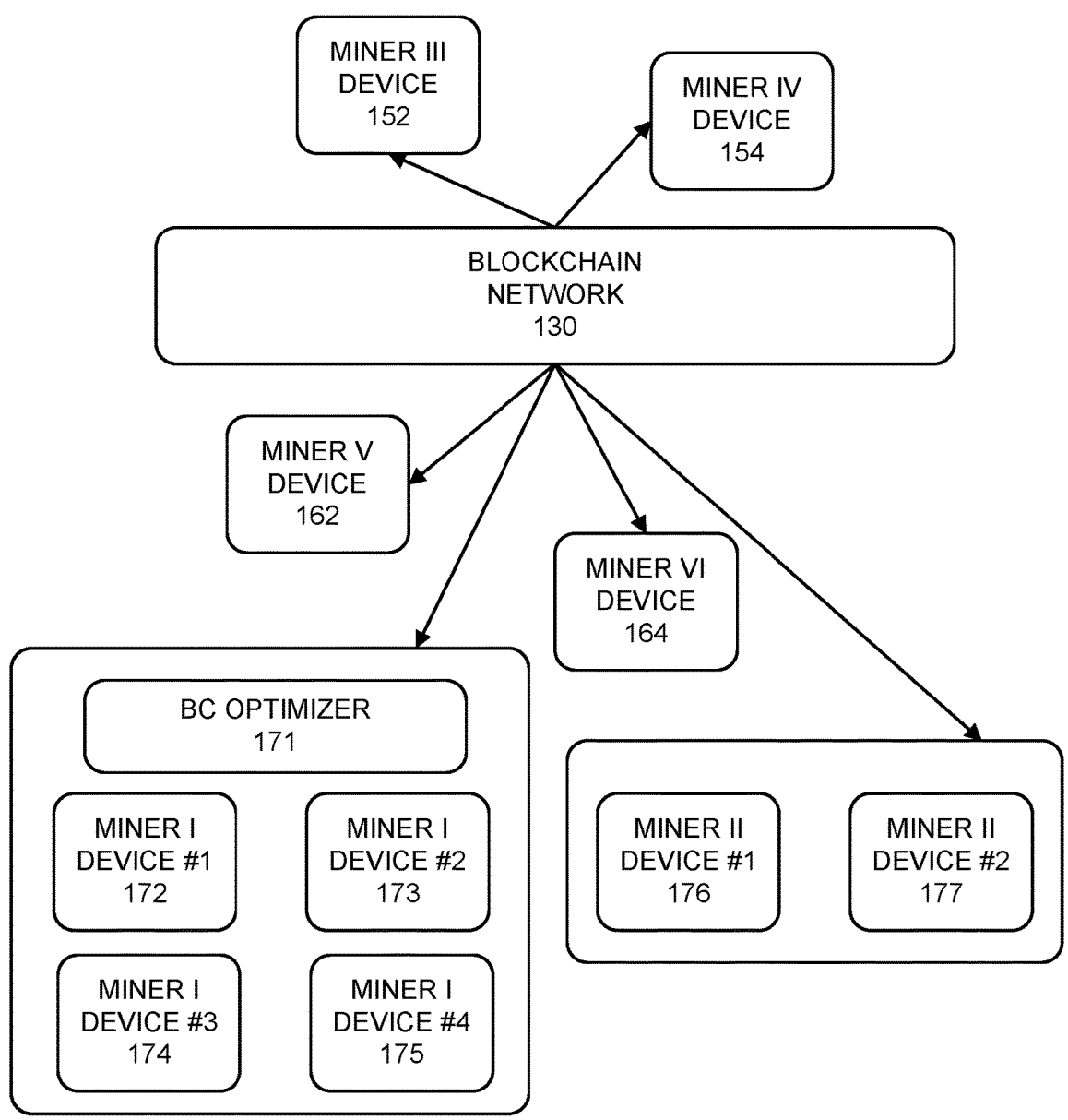
FIG. 1B illustrates a network diagram of a distributed blockchain resource network configuration with one miner utilizing the blockchain optimizer according to example embodiments.

FIG. 1B illustrates a network diagram of a distributed blockchain resource network configuration with one miner utilizing the blockchain optimizer according to example embodiments. Referring to FIG. 1B, the example network 150 includes the blockchain 130 with various miner device groups. The groups III, IV, V and VI (152, 154, 162 and 164) each have one miner device that is setup to mine and complete blocks on the blockchain. In this example, miner I and II groups each have multiple devices. Miner I has a BC optimizer 171 being used to calculate an optimal configuration given the four devices #1-#4 (172-175). Miner II also has more than one device 176 and 177. The BC optimizer 171 utilized by miner I has a record of the available devices, their locations, resources (i.e., country, memory, CPU, tax rates, energy requirements, etc.).

According to one example, which may reside one or more of the devices described or depicted herein, a blockchain expected revenue (ER) model may be calculated by [blocks solved]×[25 BC (current reward)]×[current value of BC (i.e., USD, GBP, YEN, etc.)+commission]=expected revenue (ER). Calculating revenue for a BC processing (assuming 100% processing power for all devices): one block solved every 10 mins=6 per hour*24 Hours=144 Blocks. Owning 5% of world BC processing=144 blocks*0.05%=7 to 8 blocks solved. For example, (100% processing power−Current value for BC=$400): 8 blocks×((25 BC×$400)+(60 BC×$400))=$272,000. This yields 7 to 8 blocks average solved per day and averaging 60 BC per block in transaction fees, 25 BC per solved block. The revenue for percentage of processing power: $272,000×pp %=ER, wherein the pp %−percentage of device processing power. For example, using 50% of processing power: $272,000*0.5=$136,000 projected revenue.

Regarding the expense calculated per device, expenses (Device Expenses (DE)), calculating on 8-hour intervals to align with work days/hours and peak electrical periods: electricity (peak or off peak), labor, IT costs, machine depreciation and virtual machine (VM) rental costs may be realized by cost per device for an 8-hour interval with DE). Miner I and devices 1-3 (device 4 is omitted intentionally), device #1 from FIG. 1B may be in the U.S. and have a $1^{st}$ shift 17,000, a second shift 12,000, a $3^{rd}$ shift 7,000 and a total expense of 36,000. Device #2 may be in Europe and have a $1^{st}$ shift 12,000, a second shift 6,000, a $3^{rd}$ shift 16,000 and a total expense of 34,000. Device #3 may be in Asia and have a $1^{st}$ shift 5,000, a second shift 15,000, and a $3^{rd}$ shift 10,000, and a total expense of 30,000. The total net income for using devices #1-#3 from miner I (devices around the globe) may be 136,000−100,000=$36,000.

Each device may have different percentage processing power and can be taken into account, 25% is assigned for example purposes. Tax expense optimization may include effective tax rates of central U.S. 39%, France 34% and Qatar 10%. Other embodiments may take into consideration other revenue sources and other processing portion of a business where tax rates apply—(Virtual Machine (VM) rental contracts) and potential contract for rental of 25% processing power for $30,000 per day.

Figure 2:
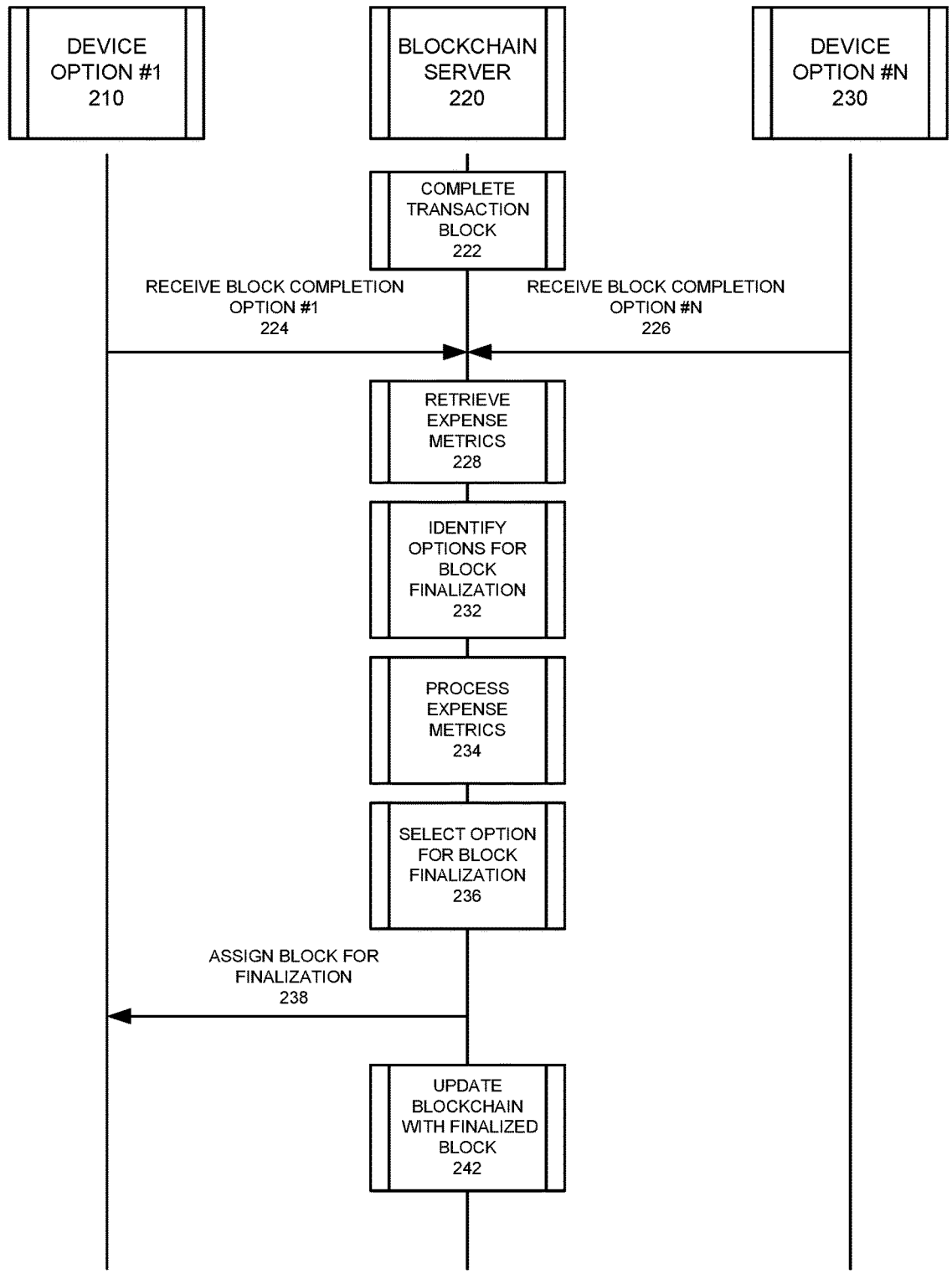
FIG. 2 illustrates a system signaling diagram of a blockchain resource allocation configuration according to example embodiments.

FIG. 2 illustrates a system signaling diagram of a blockchain resource allocation configuration according to example embodiments. Referring to FIG. 2, the example system 200 includes a first device 210 used to process blocks and other blockchain related data, and a "N" device 230, which may be a second, third, fourth or $n^{th}$ device also used to process blockchain data. A centralized blockchain model 220 serves to process data on the blockchain, including ongoing blockchain transactions. Once the block is complete, the completed transaction 222 may be identified and used as the basis to solicit offers for block finalization (i.e., solution), including hashing, organization, identification and storage to the blockchain.

The resources may be identified by various devices 224 and 226, and their corresponding operating metrics 228 may be retrieved and processed for accuracy, such as electricity, natural gas and other resources including but not limited to local government tax rates, CPU usage, memory usage, machine rental costs, staff labor costs, machine depreciation, tax deductions, etc. The options available may be identified 232 based on the processed metrics 234. This may reduce the available options to one or two options. Ultimately, one or more devices are selected 236 and assigned a block for finalization 238. The finalized block may be returned and the blockchain can be updated to include the finalized block 242.

Figure 3A:
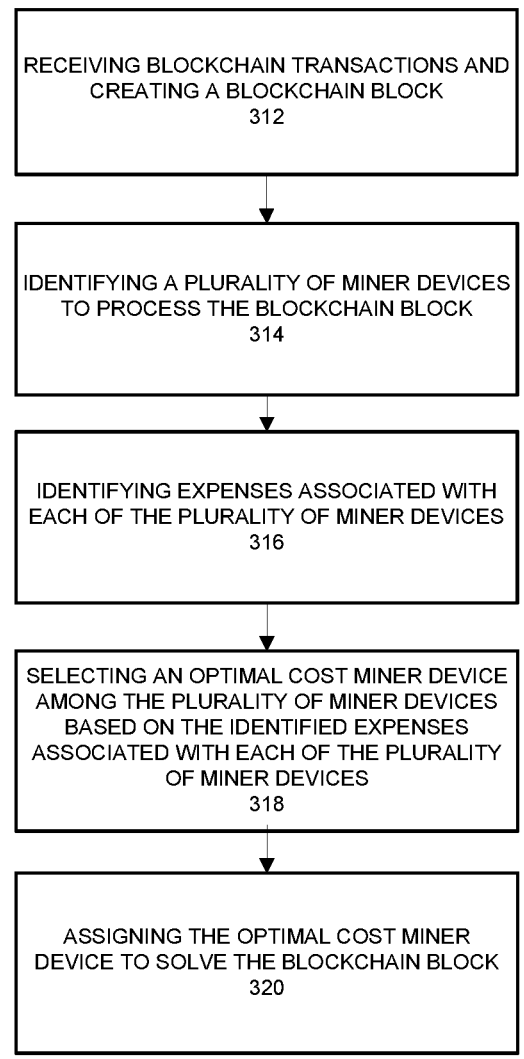
FIG. 3A illustrates a flow diagram of an example method of operation according to example embodiments.

FIG. 3A illustrates a flow diagram of an example method of operation according to example embodiments. Referring to FIG. 3A, the method may provide one or more of receiving blockchain transactions and creating a blockchain block 312. The block may include multiple transactions and may be full in its determined data storage capacity, and as a result, may not be able to include additional transactions, thus requiring a new block to be created. The example method may also provide identifying a plurality of miner devices to process the blockchain block 314 and identifying expenses associated with each of the plurality of miner devices 316. The metrics associated with the miner devices may be retrieved directly from the miner devices or may be stored in a miner device profile, which is readily accessible from a known data record storage location. Next, an optimal cost miner device may be selected among the plurality of miner devices based on the identified expenses associated with each of the plurality of miner devices 318, and the optimal cost miner device is assigned 320 to solve the blockchain block.

The blockchain block may be a completed block of the blockchain transactions requiring one of the miner devices to solve the blockchain block. The expenses associated with each of the plurality of miner devices may include one or more of an estimated central processing unit (CPU) expense, revenue expense, electricity expense, tax expense, machine depreciation expense, virtual machine rental expense, staff member expense, and memory expense. Also, the example method may include migrating the blockchain block to the optimal cost miner device, executing blockchain solve computations on the optimal cost miner device, finalizing the blockchain block on the optimal cost miner device, and storing the blockchain block. Additional operations may include identifying expenses associated with each of the plurality of miner devices further comprises retrieving data records associated with each miner device and extracting expense metrics assigned to each of the plurality of miner devices. Additionally, assigning the optimal cost miner device to solve the blockchain block may include assigning a plurality of optimal cost miner devices to solve the blockchain block by completing a hashing procedure on content of the blockchain block.

Figure 3B:
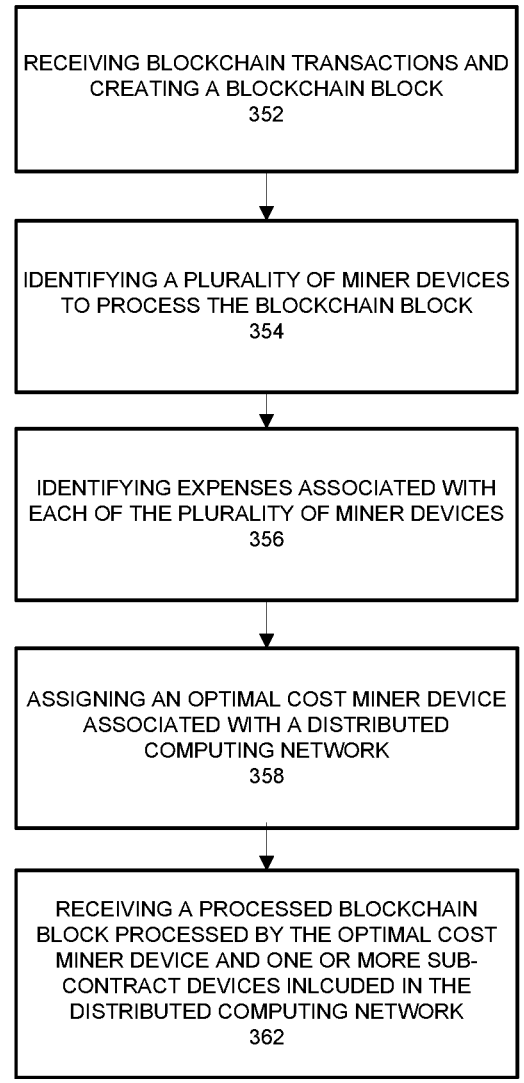
FIG. 3B illustrates another flow diagram of another example method of operation according to example embodiments.

FIG. 3B illustrates another flow diagram of an example method of operation according to example embodiments. Referring to FIG. 3B, the method 350 may provide one or more of receiving blockchain transactions and creating a blockchain block 352, identifying a plurality of miner devices to process the blockchain block 354, identifying expenses associated with each of the plurality of miner devices 356, assigning an optimal cost miner device associated with a distributed computing network 358, and receiving a processed blockchain block processed by the optimal cost miner device and at least one sub-contract device included in the distributed computing network 362.

In this example, one or more selected 'optimal' devices which are selected as the optimal miner, would then determine whether to sub-contract some of the clock cycles or other distributed computing operations to other devices in a distributed network associated with the optimal device. For example, moving CPU/clock cycles to be processed to at least one or more sub-contract devices to handle core processing and then the original miner finalizes and receives credit for the finalized block. This enables miners without ownership of specific computing resources to sub-contract or borrow resources to complete a block and compete with larger miner entities. Any computing operation can be sub-contracted including clock cycles, CPU, memory, etc.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
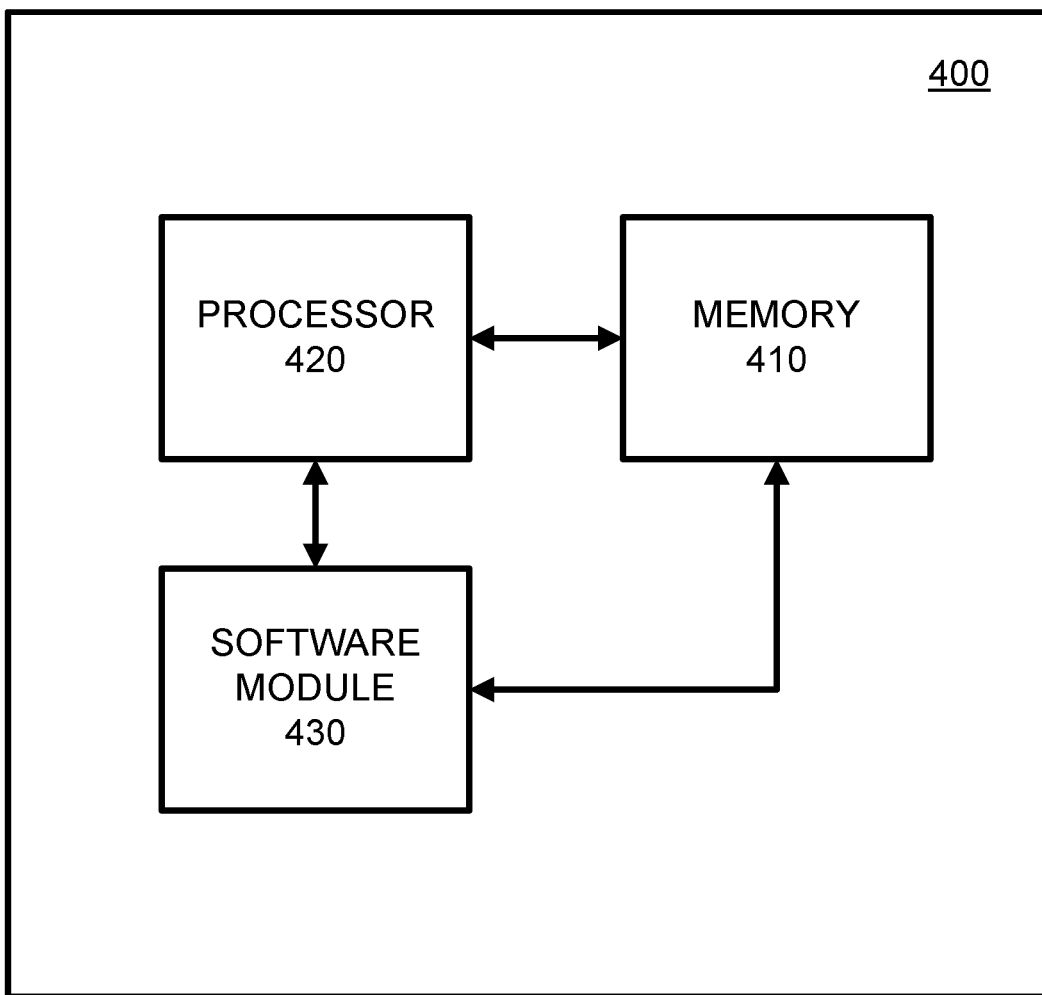
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method of optimizing a blockchain network including a blockchain server and a plurality of miner devices, the method comprising:
    receiving, by the blockchain server, blockchain transactions;
    creating, by the blockchain server, a blockchain block;
    soliciting, by the blockchain server, offers from the plurality of miner devices to solve the blockchain block;
    identifying, by the blockchain server, expenses associated with each of the plurality of miner devices in solving the blockchain block;
    selecting, by the blockchain server, an optimal cost miner device, from among the plurality of miner devices, to solve the blockchain block and receive credit for solving the blockchain block, the selecting being based on the identified expenses associated with each of the plurality of miner devices in solving the blockchain block;
    assigning, by the blockchain server, the optimal cost miner device to solve the blockchain block; and
    calculating, by the optimal cost miner device and at least one other device identified by the optimal cost miner device, a solution to the blockchain block to generate a solved blockchain block, wherein the optimal cost miner device generates a portion of the solution and the at least one other device generates a different portion of the solution; and
    receiving, by the blockchain server, the solved blockchain block from the optimal cost miner device.

2. The method of claim 1, wherein the expenses associated with each of the plurality of miner devices comprise one or more of:
    an estimated central processing unit (CPU) expense, revenue expense, electricity expense, tax expense, machine depreciation expense, virtual machine rental expense, staff member expense, and memory expense.

3. The method of claim 1, further comprising:
    migrating the blockchain block to the optimal cost miner device; and
    executing blockchain solve computations on the optimal cost miner device.

4. The method of claim 3, further comprising:
    finalizing the blockchain block on the optimal cost miner device; and
    storing the blockchain block.

5. The method of claim 1, wherein identifying expenses associated with each of the plurality of miner devices further comprises:
    retrieving data records associated with each miner device and extracting expense metrics assigned to each of the plurality of miner devices.

6. The method of claim 1, wherein assigning the optimal cost miner device to solve the blockchain block comprises:
    assigning a plurality of optimal cost miner devices to solve the blockchain block by completing a hashing procedure on content of the blockchain block.

7. A system, comprising:
    a blockchain server in a blockchain network, the blockchain server configured to:
        receive a blockchain transaction,
        create a blockchain block based on the transaction,
        solicit offers from a plurality of miner devices in the blockchain network to solve the blockchain block,
        identify expenses associated with each of the plurality of miner devices in solving the blockchain block,
        select an optimal cost miner device among the plurality of miner devices based on the identified expenses associated with each of the plurality of miner devices in solving the blockchain block, and
        assign the optimal cost miner device to solve the blockchain block,
    wherein the optimal cost miner device is configured to:
        identify at least one other device, and
        calculate, together with the at least one other device, a solution to the blockchain block to generate a solved blockchain block, wherein the optimal cost miner device generates a portion of the solution and the at least one other device generates a different portion of the solution, and
    wherein the blockchain server is further configured to receive the solved blockchain block from the optimal cost miner device.

8. The system of claim 7, wherein the expenses associated with each of the plurality of miner devices comprise one or more of:
    an estimated central processing unit (CPU) expense, revenue expense, electricity expense, tax expense, machine depreciation expense, virtual machine rental expense, staff member expense, and memory expense.

9. The system of claim 7, wherein the processor is further configured to:

migrate the blockchain block to the optimal cost miner device, and execute blockchain solve computations on the optimal cost miner device.

10. The system of claim 9, wherein the processor is further configured to:

finalize the blockchain block on the optimal cost miner device, and store the blockchain block.

11. The system of claim 7, wherein the processor identifies expenses associated with each of the plurality of miner devices by a retrieval of data records associated with each miner device and extraction of expense metrics assigned to each of the plurality of miner devices.

12. The system of claim 7, wherein the processor assigns the optimal cost miner device to solve the blockchain block by assignment of a plurality of optimal cost miner devices to solve the blockchain block and completion of a hash procedure on content of the blockchain block.

13. A non-transitory computer readable storage storing one or more instructions that when executed by one or more processors cause the one or more processors to perform:

receiving, by the blockchain server, blockchain transactions;

creating, by the blockchain server, a blockchain block;

soliciting, by the blockchain server, offers from the plurality of miner devices to solve the blockchain block;

identifying, by the blockchain server, expenses associated with each of the plurality of miner devices in solving the blockchain block;

selecting, by the blockchain server, an optimal cost miner device, from among the plurality of miner devices, to solve the blockchain block and receive credit for solving the blockchain block, the selecting being based on the identified expenses associated with each of the plurality of miner devices in solving the blockchain block;

assigning, by the blockchain server, the optimal cost miner device to solve the blockchain block; and calculating, by the optimal cost miner device and at least one other device identified by the optimal cost miner device, a solution to the blockchain block to generate a solved blockchain block, wherein the optimal cost miner device generates a portion of the solution and the at least one other device generates a different portion of the solution; and receiving, by the blockchain server, the solved blockchain block from the optimal cost miner device.

14. The non-transitory computer readable storage medium of claim 13, wherein the expenses associated with each of the plurality of miner devices comprise one or more of:

an estimated central processing unit (CPU) expense, revenue expense, electricity expense, tax expense, machine depreciation expense, virtual machine rental expense, staff member expense, and memory expense.

15. The non-transitory computer readable storage medium of claim 13, wherein the one or more instructions further cause the one or more processors to perform:

migrating the blockchain block to the optimal cost miner device; and executing blockchain solve computations on the optimal cost miner device.

16. The non-transitory computer readable storage medium of claim 15, wherein the one or more instructions further cause the one or more processors to perform:

finalizing the blockchain block on the optimal cost miner device; and storing the blockchain block.

17. The non-transitory computer readable storage medium of claim 13, wherein the identifying expenses associated with each of the plurality of miner devices further comprises:

retrieving data records associated with each miner device and extracting expense metrics assigned to each of the plurality of miner devices, and wherein assigning the optimal cost miner device to solve the blockchain block comprises assigning a plurality of optimal cost miner devices to solve the blockchain block by completing a hashing procedure on content of the blockchain block.

* * * * *